(12) United States Patent
Thurlow et al.

(10) Patent No.: US 9,165,063 B2
(45) Date of Patent: Oct. 20, 2015

(54) ORGANISING AND STORING DOCUMENTS

(75) Inventors: Ian Thurlow, Woodbridge (GB);
Richard Thurlow, Felixstowe (GB);
Nicholas J Davies, Colchester (GB)

(73) Assignee: BRITISH TELECOMMUNICATIONS public limited company (GB)

( * ) Notice: Subject to any disclaimer, the term of this patent is extended or adjusted under 35 U.S.C. 154(b) by 1799 days.

(21) Appl. No.: 12/307,622

(22) PCT Filed: Jul. 5, 2007

(86) PCT No.: PCT/GB2007/002566
§ 371 (c)(1),
(2), (4) Date: Jan. 6, 2009

(87) PCT Pub. No.: WO2008/003992
PCT Pub. Date: Jan. 10, 2008

(65) Prior Publication Data
US 2009/0327276 A1 Dec. 31, 2009

(30) Foreign Application Priority Data

Jul. 6, 2006 (EP) ..................................... 06253537

(51) Int. Cl.
*G06F 17/30* (2006.01)

(52) U.S. Cl.
CPC .... *G06F 17/30722* (2013.01); *G06F 17/30616* (2013.01)

(58) Field of Classification Search
CPC .............. G06N 99/005; G06F 17/3071; G06F 17/30719; G06F 17/30997
See application file for complete search history.

(56) References Cited

U.S. PATENT DOCUMENTS

| 5,394,509 | A * | 2/1995 | Winston .......................... 706/13 |
| 5,404,514 | A   | 4/1995 | Kageneck et al. |
| 6,189,002 | B1  | 2/2001 | Roitblat |
| 6,233,575 | B1* | 5/2001 | Agrawal et al. ........ 707/999.002 |
| 6,411,962 | B1  | 6/2002 | Kupiec |

(Continued)

FOREIGN PATENT DOCUMENTS

| WO | 0248905    | 6/2002 |
| WO | 2004010331 | 1/2004 |

OTHER PUBLICATIONS

Aizawa, "An information-theoretic perspective of tf-idf measures", Information Processing & Management, Elsevier, Barking, GB, vol. 39, No. 1, Jan. 2003, pp. 45-65, XP004397212.

(Continued)

*Primary Examiner* — Yuk Ting Choi
(74) *Attorney, Agent, or Firm* — Nixon & Vanderhye P.C.

(57) ABSTRACT

A data handling device has access to a store of existing metadata pertaining to existing documents having associated metadata terms. It analyses the metadata to generate statistical data as to the co-occurrence of pairs of terms in the metadata of one and the same document. When a fresh document is received, it is analysed to assign to it a set of terms and determine for each a measure of their strength of association with the document. Then, for each term of the set, a score is generated that is a monotonically increasing function of (a) the strength of association with the document and of (b) the relative frequency of co-occurrence of that term and another term that occurs in the set; metadata for the fresh document are then selected as the subset of the terms in the set having the highest scores.

18 Claims, 1 Drawing Sheet

(56) References Cited

U.S. PATENT DOCUMENTS

| | | | |
|---|---|---|---|
| 6,473,753 B1 * | 10/2002 | Katariya et al. | 707/999.004 |
| 6,651,058 B1 * | 11/2003 | Sundaresan et al. | 707/999.003 |
| 6,651,059 B1 | 11/2003 | Sundaresan et al. | |
| 6,850,937 B1 | 2/2005 | Hisamitsu et al. | |
| 6,912,525 B1 | 6/2005 | Chipalkatti et al. | |
| 7,158,983 B2 * | 1/2007 | Willse et al. | 707/999.102 |
| 7,634,462 B2 | 12/2009 | Weyand et al. | |
| 7,752,220 B2 | 7/2010 | Weyand et al. | |
| 2003/0033218 A1 | 2/2003 | Flaxer et al. | |
| 2003/0172357 A1 | 9/2003 | Kao et al. | |
| 2004/0230577 A1 * | 11/2004 | Kawatani | 707/6 |
| 2004/0260695 A1 | 12/2004 | Brill | |
| 2005/0256867 A1 | 11/2005 | Walther et al. | |
| 2006/0259481 A1 | 11/2006 | Handley | |
| 2007/0038602 A1 | 2/2007 | Weyand et al. | |
| 2007/0038621 A1 | 2/2007 | Weyand et al. | |

OTHER PUBLICATIONS

Moens, M-F, Dumortier, J., "Text categorization: the assignment of subject descriptors to magazine articles," *Information Processing & Management*, vol. 36, No. 6 (Nov. 2000), pp. 841-861.

Christian Plaunt, Barbara A. Norgard, "An Association Based Method for Automatic Indexing with a Controlled Vocabulary," (1998); at http://citeseerx.ist.psu.edu/viewdoc/download:jsessionid=9C6948AA5F6100456728F6F2E6C124E1?doi=10.1.1.38.7688&rep=rep1&type=pdf.

Hsinchun Chen; Schatz, B.; Ng., T., Martinez, J.; Kirchhoff, A.; Chienting Lin, "A Parallel Computing Approach to Creating Engineering Concept Spaces for Semantic Retrieval; The Illinois Digital Library Iniative Project," IEEE Transactions on Pattern Analysis and Machine Intelligence, vol. 18 Issue: 8, Date: Aug. 1996, pp. 771-782.

Kamps, J. "Improving retrieval effectiveness by reranking documents based on controlled vocabulary," *Lecture Notes in Computer Science*, Springer Berlin/Heidelberg 2004, pp. 283-295.

International Search Report for PCT/GB2007/002566, mailed Oct. 10, 2007.

Sebastani, F., "Machine Learning in Automated Text Categorization," ACM Computing Surveys, vol. 34, No. 1 (Mar. 1, 2002), pp. 1-47.

International Search Report for PCT/GB2008/000844, mailed Jun. 26, 2008.

Salton, G. et al., "Term-Weighting Approaches in Automatic Text Retrieval", vol. 24, No. 5, (1998), pp. 513-523.

Kang et al., "Two-level Document Ranking Using Mutual Information Retrieval", Information Processing & Management, Elsevier Barking, GB, vol. 33, No. 3, May 1997, pp. 289-306, XP004091802.

Spasic et al., Using Automatically Learnt Verb Selectional Preferences for Classification of Biomedical Informatics, Academic Press, New York, NY, US, vol. 37, No. 6, Dec. 2004, pp. 483-497, XP004634342.

Aizawa, "An information-theoretic perspective of tf-idf measures", Information Processing & Management, Elsevier, Barking, GB, vol. 39, No. 1, Jan. 2003, pp, 45-65, XP004397212.

Schutze et al., "A Cooccurrence-Based Thesaurus and Two Applications to Information Retrieval", Information Processing & Management, Elsevier Barking, GB, vol. 33, No. 3, May 1997, pp. 307-318, XP004091803.

Schatz, Bruce R. et al., "Interactive term suggestion for users of digital libraries: using subject thesauri and co-occurrence lists for information retrieval," Proceedings of the first ACM international conference on Digital libraries table of contents, Bethesda, Maryland, United States, 1996 (ISBN: 0-89791-830-4), pp. 126-133.

* cited by examiner

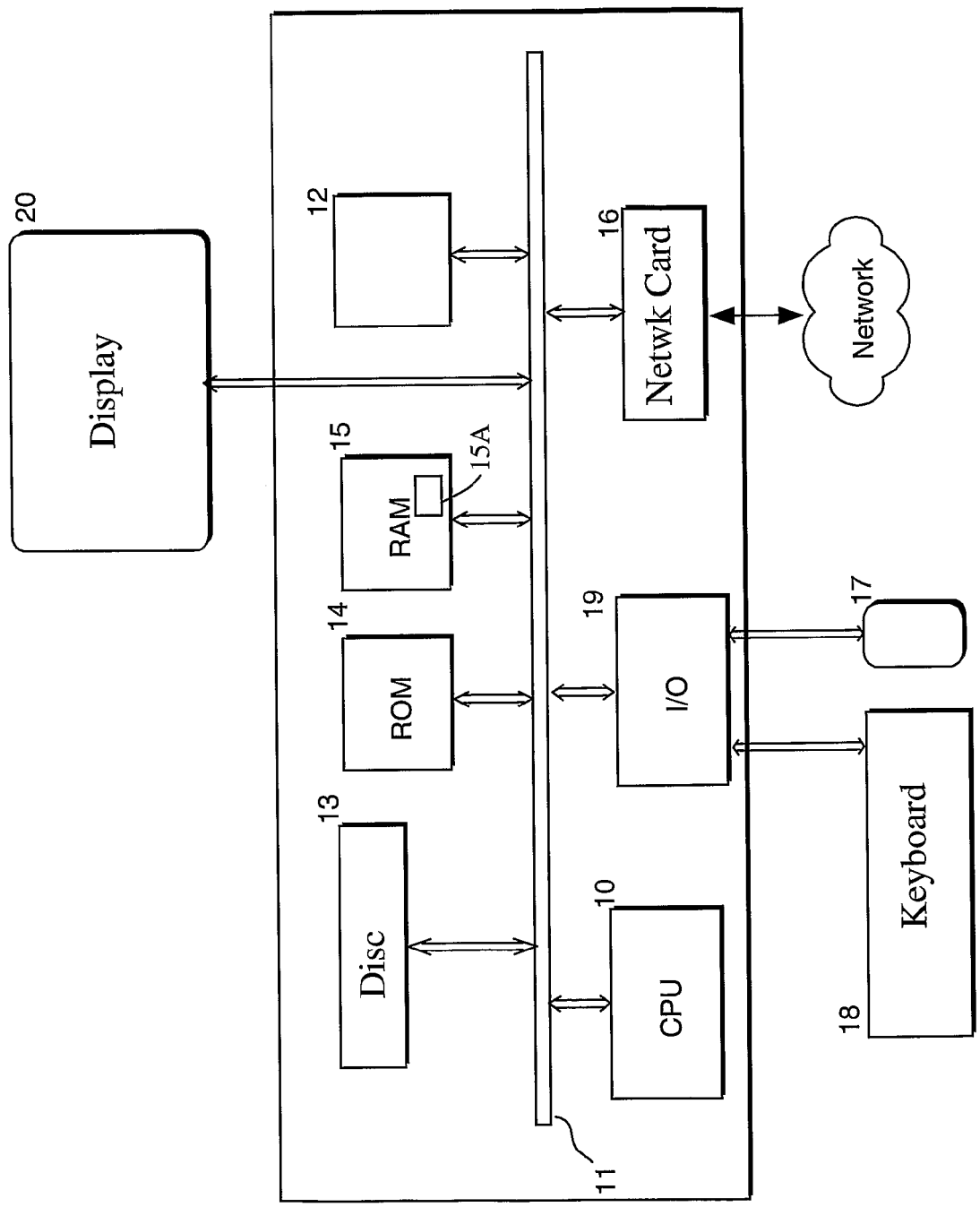

ORGANISING AND STORING DOCUMENTS

This application is the U. S. national phase of International Application No. PCT/GB2007/002566 filed 5 Jul. 2007 which designated the U. S. and claims priority to European Application No. 06253537.2, filed 6 Jul. 2006 the entire contents of each of which are hereby incorporated by reference.

BACKGROUND AND SUMMARY

This application is concerned with organising and storing documents for subsequent retrieval.

According to the present invention there is provided a data handling device for organising and storing documents for subsequent retrieval, the documents having associated metadata terms, the device comprising:
means providing access to a store of existing metadata;
means operable to analyse the existing metadata to generate statistical data as to the co-occurrence of pairs of terms in the metadata of one and the same document;
means for analysing a fresh document to assign to it a set of terms and determine for each a measure of their strength of association with the document;
means operable to determine for each term of the set a score that is a monotonically increasing function of (a) the strength of association with the document and of (b) the relative frequency of co-occurrence, in the existing metadata, of that term and another term that occurs in the set;
means operable to select, as metadata for the fresh document, a subset of the terms in the set having the highest scores.

Other aspects of the invention are defined in the claims.

BRIEF DESCRIPTION OF THE DRAWINGS

One embodiment of the invention will now be further described, by way of example, with reference to the accompanying drawings, in which:

FIG. 1 is a schematic diagram of a typical architecture for a computer on which software implementing the invention can be run.

DETAILED DESCRIPTION OF PRESENT EXAMPLE EMBODIMENTS

FIG. 1 shows the general arrangement of a document storage and retrieval system, implemented as a computer controlled by software implementing one version of the invention. The computer comprises a central processing unit (CPU) 10 for executing computer programs, and managing and controlling the operation of the computer. The CPU 10 is connected to a number of devices via a bus 11. These devices include a first storage device 12, for example a hard disk drive for storing system and application software, a second storage device 13 such as a floppy disk drive or CD/DVD drive, for reading data from and/or writing data to a removable storage medium, and memory devices including ROM 14 and RAM 15. The computer further includes a network card 16 for interfacing to a network. The computer can also include user input/output devices such as a mouse 17 and keyboard 18 connected to the bus 11 via an input/output port 19, as well as a display 20. The architecture described herein is not limiting, but is merely an example of a typical computer architecture. It will be further understood that the described computer has all the necessary operating system and application software to enable it to fulfil its purpose. The system serves to handle documents in text form, or at least, in a format which includes text. In order to facilitate searching for retrieval of documents, the system makes use of a set of controlled indexing terms. Typically this might be a predefined set of words and/or phrases that have been selected for this purpose. The INSPEC system uses just such a set. The INSPEC Classification and Thesaurus are published by the Institution of Engineering and Technology. The system moreover presupposes the existence of an existing corpus of documents that have already been classified—perhaps manually—against the term set (of the controlled language). Each document has metadata comprising a list of one of more terms that have been assigned to the document (for example, in the form of a bibliographic record from either INSPEC or ABI). The system requires a copy of this metadata and in this example this is stored in an area 15A of the RAM 15, though it could equally well be stored on the hard disk 12 or on a remote server accessible via the network interface 16. It does not necessarily require access to the documents themselves.

Broadly, the operation of the system comprises four phases:
(i) Initial training, analysing the pre-existing metadata (controlled indexing terms);
(ii) processing of a new, unclassified document to identify an initial set of terms and their strength of association with the document;
(iii) refinement of the term allocation to generate the metadata for the new document, making use of the results of the training.
(iv) searching among the metadata (including the newly-generated metadata) for documents matching desired search criteria.

Training 1.1 The training process analyses the existing metadata, to generate a set of co-occurrence data for the controlled indexing terms. In this description, references to a document having a term assigned to it mean that that term appears in the metadata for that document. The co-occurrence data for each controlled indexing term can be expressed as a vector which has an element for every controlled indexing term, each element being a weight indicative of the frequency of co-occurrence of that controlled indexing term and the head term (that is to say, the controlled indexing term for which the vector is generated). More particularly, the weight is the number of documents that have been assigned both controlled indexing terms, divided by the total number of documents to which the head term has been assigned.

In mathematical terms, the vector $V_i$ for term i can be expressed as:

$$V_i = \{v_{ij}\}, j=1 \ldots N$$

where $$v_{ij} = \frac{c_{ij}}{c_{ii}}$$

where $c_{ij}$ is the number of training documents each having both term i and term j assigned to it, and the vector has N elements, where N is the number of index terms. Actually the term $v_{ii}$ is always unity and can be omitted. Moreover, in practice, there are likely to be a large number of index terms, so that the vast majority of elements will be zero and we prefer not to store the zero elements but rather to use a concise representation in which the data are stored as an array with the names of the nonzero terms and their values alongside. Preferably these are stored in descending order of weight.

1.2 Optionally, each vector is subjected to a further stage (vector intersection test) as follows:

for each term listed in the vector, compare the vector for the listed term with the vector under consideration to determine a rating equal to the number of terms appearing in both vectors. In the prototype, this was normalised by division by 50 (an arbitrary limit placed on the maximum size of the vector); however we prefer to divide by half the sum of the number of nonzero terms in the two vectors.

delete low-rating terms from the vector (typically, so that a set number remain).

Analyse New Document

A new document (e.g. a web page) is to be classified. It is firstly analysed to identify an initial set of terms and their strength of association with the document. There are a number of ways of doing it: the simplest method, which can be used where the predetermined set of terms is such that there is strong probability that the terms themselves will occur in the text of a relevant document is (2.1) to search the document for occurrences of indexing terms, and produce a list of terms found, along with the number of occurrences of each.

The result can be expressed as $R=\{r_k\}_{k=1...N}$ where $r_k$ is the number of occurrences of term k in the new document, although again, in practice a more concise representation is preferred.

Refinement

Rather than simply choose, as the metadata, the terms of R that occur most frequently in the document, the object here is to determine for each term that is present in the document a score that not only reflects the frequency of that term in the document but also takes account of the co-occurrence statistics obtained in the training phase. In effect, the aim is to boost the scores for those terms which the vectors show to have been seen in the past in company with other indexing terms also found in the unknown document. This process proceeds as follows:

3.1 Take the first term $r_1$ of the list and retrieve its vector.
3.2 Determine which terms occur in both the list and the vector.
3.3 Calculate a score:

$$s = topicfrequency * sqrt(vectorlength) * (1 + log_e(\#topicwords)) * extrastrength$$

where topicfrequency is the number of occurrences $r_k$ of this first term in the document
vectorlength is the number of terms identified at step 3.2.
topicwords is the number of words making up this first term
and extrastrength is the sum of the square roots of the vector weights for the terms identified in step 3.2.

If desired, extrastrength might also take into account the numbers of occurrences of the various terms in the document.

3.4 Repeat steps 3.2 and 3.3 for each of the other terms in the list.
3.5 Choose the highest-scoring term (or terms, up to some desired maximum number of terms) as the terms to be included in the metadata for this document.

In terms of the previous mathematical representation, this process may be expressed as:

```
Compute score s_k for each term in the document
For k = 1 to N
    IF r_k = 0 THEN s_k = 0 GOT skip
    vectorlength = 0
    extrastrength =1
```
```
    FOR p=1 TO N
    IF r_p ≠ 0 AND v_kp ≠ 0 THEN
        vectorlength = vectorlength + 1
            extrastrength = extrastrength + SQRT(v_kp)
        END IF
    NEXT p
    s_k = r_k *SQRT(vectorlength)*(1 + log(#topicwords))*extrastrength
skip:
NEXT k
```

The index terms are those having the largest values of $s_k$.

Once the metadata have been generated, then the new document can be added to the existing store of documents (or to a separate one) and the metadata stored similarly. The new document is then available to be retrieved by the fourth, searching step, which can be performed in a conventional manner.

In implementing such a system, there is design choice to be made, as to whether the automatically-generated metadata are to be available for subsequent analyses for the purpose of generating the weight vectors, or whether the designer prefers not to take the risk that errors in automatically generated metadata may propagate to reduce the efficacy of subsequent generations of metadata. In the latter case, the automatically stored metadata should be stored separately, or flagged appropriately, to prevent its use for this purpose whilst allowing it to remain available for searching purposes.

Variations

As described above, scores are generated only for terms found in the preceding analysis step. To accommodate the possibility that a controlled term might be suitable but not be found at this stage, it is possible to deduce its suitability by observing that its vector contains high weightings for terms that are found in (or otherwise associated with) the document. Thus, in a modification, steps 3.1 to 3.3 are performed for every one of the N terms. The formula for s is unchanged except that topicfrequency is set to 1.0 instead of its true value of zero.

In the example given above, the initial assignment of terms to the new document was performed simply by searching for instances of the terms in the document. An alternative approach—which will work (inter alia) when the terms themselves are not words at all (as in, for example, the International Patent Classification, where controlled terms like H04L12/18, or G10F1/01, are used)—is to generate vectors indicating the correlation between controlled indexing terms and free-text words in the documents and then use these to translate a set of words found in the new document into controlled indexing terms. Such a method is described by Christian Plaunt and Barbara A. Norgard, "An Association-Based Method for Automatic Indexing with a Controlled Vocabulary", *Journal of the American Society of Information Science*, vol. 49, no. 10, (1988), pp. 888-902. There, they use the INSPEC abstracts and indexing terms already assigned to them to build a table of observed probabilities, where each probability or weight is indicative of the probability of co-occurrence in a document of a pair consisting of (a) a word (uncontrolled) in the abstract or title and (b) an indexing term. Then, having in this way learned the correlation between free-text words and the indexing terms, their system searches the unclassified document for words that occur in the table and uses the weights to translate these words into indexing terms. They create for the ith document a set of scores $x_{ij}$ each for a respective indexing term j, where the $x_{ij}$ is the sum of the weight for each pair consisting of a word found in the document and term j.

These methods can also be applied to documents that are not text documents—for example visual images. In that case, the first step, of analysing the existing metadata, is unchanged. The step of analysing the documents can be performed by using known analysis techniques appropriate to the type of document (e.g. an image recognition system) to recognise features in the document and their rate of occurrence. The Plaunt et al correlation may them be used to translate these into controlled terms and accompanying frequencies, followed by the refinement step just as described above.

The invention claimed is:

1. A data handling device for organising and storing documents for subsequent retrieval, the documents having associated metadata terms, the device comprising:
    means configured to provide access to a store of existing metadata;
    means configured to analyse the existing metadata to generate statistical data as to co-occurrence of pairs of terms in the metadata of a single document;
    means configured to analyse a fresh document to assign to the fresh document a set of terms and configured to determine a measure of a strength of association of each term with the document;
    means configured to determine for each term of the set of terms a score that is a monotonically increasing function of (a) the strength of association with the document and of (b) a relative frequency of co-occurrence, in the existing metadata, of the term and another term that occurs in the set of terms;
    means configured to select, as metadata for the fresh document, a subset of the terms in the set of terms having highest scores.

2. The data handling device according to claim 1, in which the terms are terms of a predetermined set of terms.

3. The data handling device according, to claim 1, in which analysis of the metadata generates for each term a set of weights, each weight indicating a number representing how many documents have been assigned both the term in question and a respective other term, divided by a total number of documents to which the term in question has been assigned.

4. The data handling device according to claim 3 in which each set of weights is further processed by:
    for each term for which a nonzero weight has been generated, comparing the set of weights for the term with the set of weights under consideration to determine a rating equal to the number of terms appearing in both sets of weights; and
    deleting low-rating terms from the set of terms.

5. The data handling device according to claim 1, in which the terms are words or phrases and the strength of association determined by document analysis for each term is a number representing how many times the term occurs in the document.

6. The data handling device according to claim 1, in which the score for a term is proportional to the strength of association.

7. The data handling device according to claim 1, in which the score for a term is proportional to the square root of a number representing how many terms have been assigned to the document and also have nonzero weights in the set of weights for that term.

8. The data handling device according to claim 1, in which the score for a term is also a function of the weights in the set of weights for that term.

9. The data handling device according to claim 8, in which the score for a term is a function of the sum of the square roots of the weights in the set of weights for that term.

10. A method of organising and storing documents in a computer system for subsequent retrieval, the documents having associated metadata terms, the method comprising:
    providing access to a store of existing metadata in the computer system;
    analysing the existing metadata to generate statistical data as to co-occurrence of pairs of terms in the metadata of a single document;
    analysing a fresh document to assign to the fresh document a set of terms and determine for each term of the set a measure of a strength of association of the term with the document;
    determining for each term of the set a score that is a monotonically increasing function of (a) the strength of association with the document and of (b) a relative frequency of co-ocurrence, in the existing metadata, of the term and another term that occurs in the set; and
    selecting, as metadata for the fresh document, a subset of the terms in the set having highest scores.

11. The method according to claim 10, in which the terms are terms of a predetermined set of terms.

12. The method according to claim 10, in which analysis of the metadata generates for each term a set of weights, each weight indicating a number representing how many documents have been assigned both the term in question and a respective other term, divided by a total number of documents to which the term in question has been assigned.

13. The method according to claim 12 in which each set of weights is further processed by:
    for each term for which a nonzero weight has been generated, comparing the set of weights for the term with the set of weights under consideration to determine a rating equal to the number of terms appearing in both sets of weight; and
    deleting low-rating terms from the set of terms.

14. The method according to claim 10 in which the terms are words or phrases and the strength of association determined by document analysis for each term is a number representing how many times the term occurs in the document.

15. The method according to claim 10, in which the score for a term is proportional to the strength of association.

16. The method according to claim 10, in which the score for a term is proportional to the square root of a number a number representing how many terms have been assigned to the document and also have nonzero weights in the set of weights for that term.

17. The method according to claim 10, in which the score for a term is also a function of the weights in the set of weights for that term.

18. The method according to claim 17, in which the score for a term is a function of the sum of the square roots of the weights in the set of weights for that term.

* * * * *

UNITED STATES PATENT AND TRADEMARK OFFICE
CERTIFICATE OF CORRECTION

PATENT NO. : 9,165,063 B2
APPLICATION NO. : 12/307622
DATED : October 20, 2015
INVENTOR(S) : Thurlow et al.

It is certified that error appears in the above-identified patent and that said Letters Patent is hereby corrected as shown below:

Title Page

Item [75] Inventors should read: Ian Thurlow, Woodbridge (GB)

Richard Weeks, Felixstowe (GB)

Nicholas J. Davies, Colchester (GB)

Signed and Sealed this
Twelfth Day of July, 2016

Michelle K. Lee
*Director of the United States Patent and Trademark Office*